(No Model.)
J. M. CHRISTOPHER.
TRACK CLEARER.
No. 402,405. Patented Apr. 30, 1889.
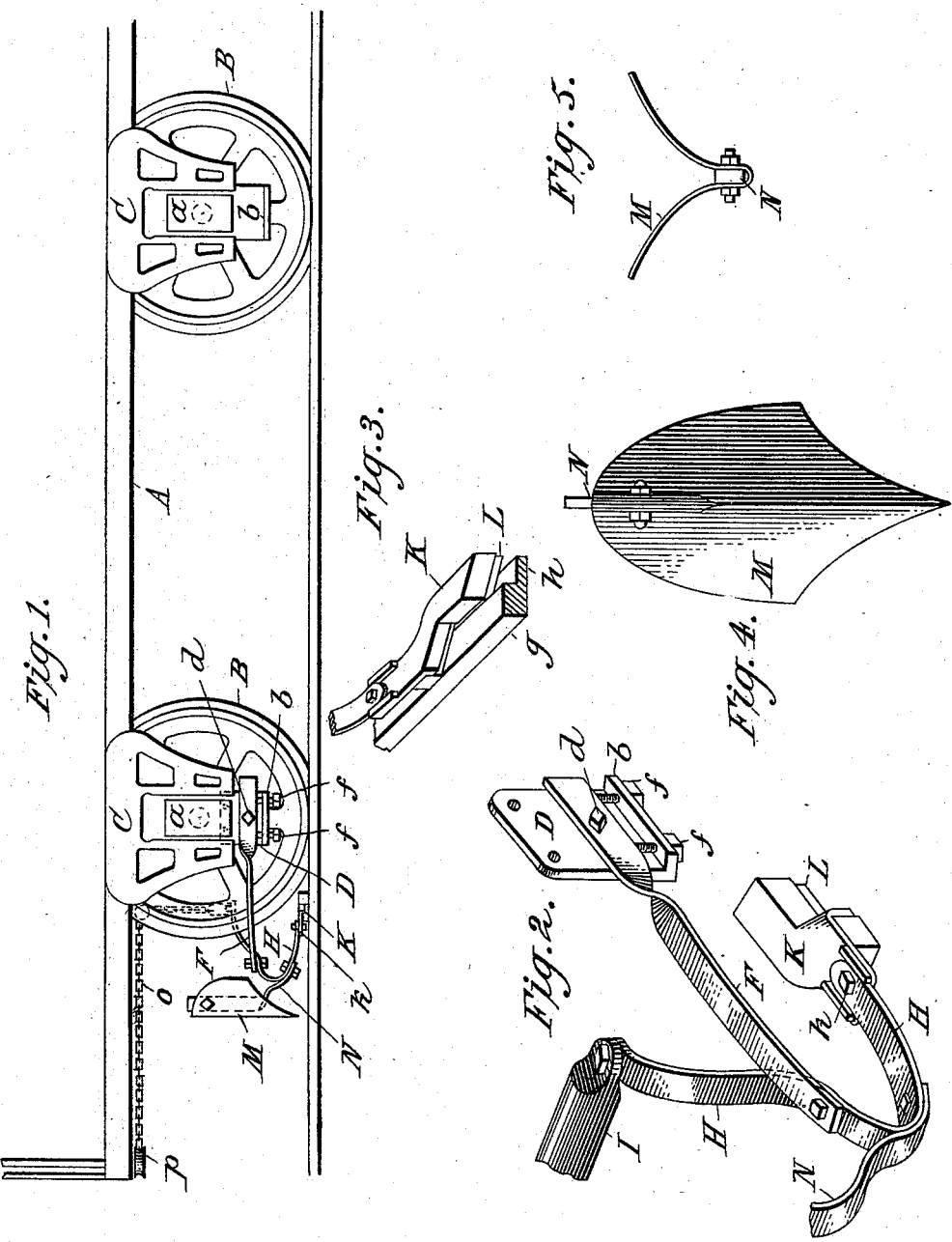
Witnesses:
Dan'l Fisher
Jas S Sparklin
Inventor:
John M Christopher

UNITED STATES PATENT OFFICE.

JOHN M. CHRISTOPHER, OF CLIFTON, MARYLAND.

TRACK-CLEARER.

SPECIFICATION forming part of Letters Patent No. 402,405, dated April 30, 1889.

Application filed June 1, 1888. Serial No. 275,786. (No model.)

*To all whom it may concern:*

Be it known that I, JOHN M. CHRISTOPHER, of Clifton, in the county of Baltimore and State of Maryland, have invented certain Improvements in Track-Clearers, of which the following is a specification.

This invention relates to improved devices which are attached to the axle-boxes of a street-car to clear the track of ice, snow, and dirt, as will hereinafter fully appear.

In the further description of the said invention which follows, reference is made to the accompanying drawings, forming a part hereof, and in which—

Figure 1 is an exterior side elevation of certain parts of a street-car to which my invention is applied. Figs. 2 and 3 are perspective views of parts of the apparatus. Figs. 4 and 5 are respectively a front and a top view of a part of the invention.

Similar letters of reference indicate similar parts of the invention in all the figures.

A is the platform of a street-car, and B B are the wheels of the same, secured to axles $a$ in the usual manner.

C C are the axle-boxes, of common construction.

D is a bracket bolted to the inner surface of the axle-box and projecting below the same, and it is provided with a flange, $b$, for a purpose hereinafter described.

F is a spring-bar fastened to the bracket D by means of a pivotal bolt, $d$, and set-screws $f$, the latter being in the flange of the bracket and serving, in addition to securing the said bar in place, to adjust the same with reference to the track, as hereinafter described.

The spring-bar F is curved slightly downward and bolted to a second spring-bar, H, one end of which is thrown in toward the longitudinal center line of the car, where it is attached to a rod, I, which connects it to a similar spring-bar on the opposite side of the car, and the other bent downward toward the track and backward to under the edge of the wheel.

K is a box of angular shape, as seen from its top, containing a block, L, of rubber or some other similar material, which projects below its lower edge and bears on the two members $g$ and $h$ of the track-rail, as shown in Fig. 3. This box is attached loosely to the lower end of the bar H by means of the pivotal bolt $k$, so that it may move independently of the said bar as the car rounds a curve.

The bar I serves to make the clearing devices on the rails move together, and a chain, $o$, is attached to this bar and extends to a flanged wheel, $p$, whereby the chain is wound from the car-platform, and the whole clearing devices at one end of the car raised to avoid serious obstructions.

In cases of deep snow a plow, M, is fastened to an arm, N, provided for the purpose, and cleans the track sufficiently to enable the rubber blocks to perform their proper function of thoroughly cleaning the rails.

The set-screws $f$, before alluded to, are used to give the proper pressure of the rubber blocks L on the track-rails, as by loosening one set-screw and tightening the other the spring-bar may be tilted either to or from the rail.

I claim as my invention—

1. In a track-clearer, a spring-bar attached to the axle-box of a car, extending forward of the wheel and then backward toward the said wheel, and provided at its ends with a box or holder containing a block of rubber having a face adapted to fit the face of the track-rail, substantially as and for the purpose specified.

2. In a track-clearer, a spring-bar attached to the axle-box of the car, extending forward and then backward toward the wheel, having at its ends a box containing a block of rubber of angular shape as seen from its top, and provided with a face adapted to fit the surface of the track-rail, substantially as and for the purpose specified.

JOHN M. CHRISTOPHER.

Witnesses:
WM. T. HOWARD,
DANL. FISHER.